Jan. 25, 1927.

W. H. REES 1,615,405

WEIGHING APPARATUS

Filed Sept. 21, 1922 6 Sheets-Sheet 2

WITNESS

INVENTOR
WILLIAM H. REES
BY

ATTORNEYS

Jan. 25, 1927.

W. H. REES 1,615,405

WEIGHING APPARATUS

Filed Sept. 21, 1922 6 Sheets-Sheet 4

INVENTOR.
WILLIAM H. REES
BY White Prost + Evans
ATTORNEYS.

Jan. 25, 1927.

W. H. REES 1,615,405

WEIGHING APPARATUS

Filed Sept. 21, 1922

6 Sheets-Sheet 5

WITNESS:
Bernard H. Hoolin

INVENTOR.
WILLIAM H. REES.
BY White Prost & Evans
ATTORNEYS.

Jan. 25, 1927.

W. H. REES 1,615,405

WEIGHING APPARATUS

Filed Sept. 21, 1922    6 Sheets-Sheet 6

INVENTOR.
WILLIAM H. REES
BY *White Prost Evans*
ATTORNEYS.

WITNESS.

Patented Jan. 25, 1927.

1,615,405

UNITED STATES PATENT OFFICE.

WILLIAM H. REES, OF BERKELEY, CALIFORNIA.

WEIGHING APPARATUS.

Application filed September 21, 1922. Serial No. 589,498.

My invention relates to weighing devices and the broad purpose of the invention is the provision of a weighing machine capable of a high degree of accuracy in continuous operation, that is, one in which a continuous succession of loads is accurately weighed and recorded and then discharged.

Another object of the invention is the provision of a weighing machine for handling material discharging from a chute, and which will record with close accuracy the weight of each successive total load, including the dribble or overage which is in the air at the instant the completion of the unit load effects the closing of the chute and the momentary interruption of the flow of the material pending the discharge of the weighed total load. Another object of the invention is the provision of an apparatus of the character described in which the scale beam, or other moving part affected by the weight of the machine, is uninfluenced by any frictional resistance other than that inherently residing in the weighing mechanism, and in which the initiation of a cycle of operations is the result of a spark discharged between two electrodes, the gap between which, is varied by the movement of certain scale parts effected by the weight on the scale.

Another object of the invention is the provision of a weighing machine of the character described in which the weight of the load is utilized to effect the dumping of the load. Another object of the invention is the provision of a weighing machine of the character described in which is embodied improved electrical devices for controlling the several phases of its operation.

My invention possesses other objects and features of advantage, some of which, with the foregoing, will be set forth in the following description of the invention. It is to be understood that I do not limit myself to the showing made by the said description as I may adopt variant forms of the invention within the scope of the claims.

Figure 1:
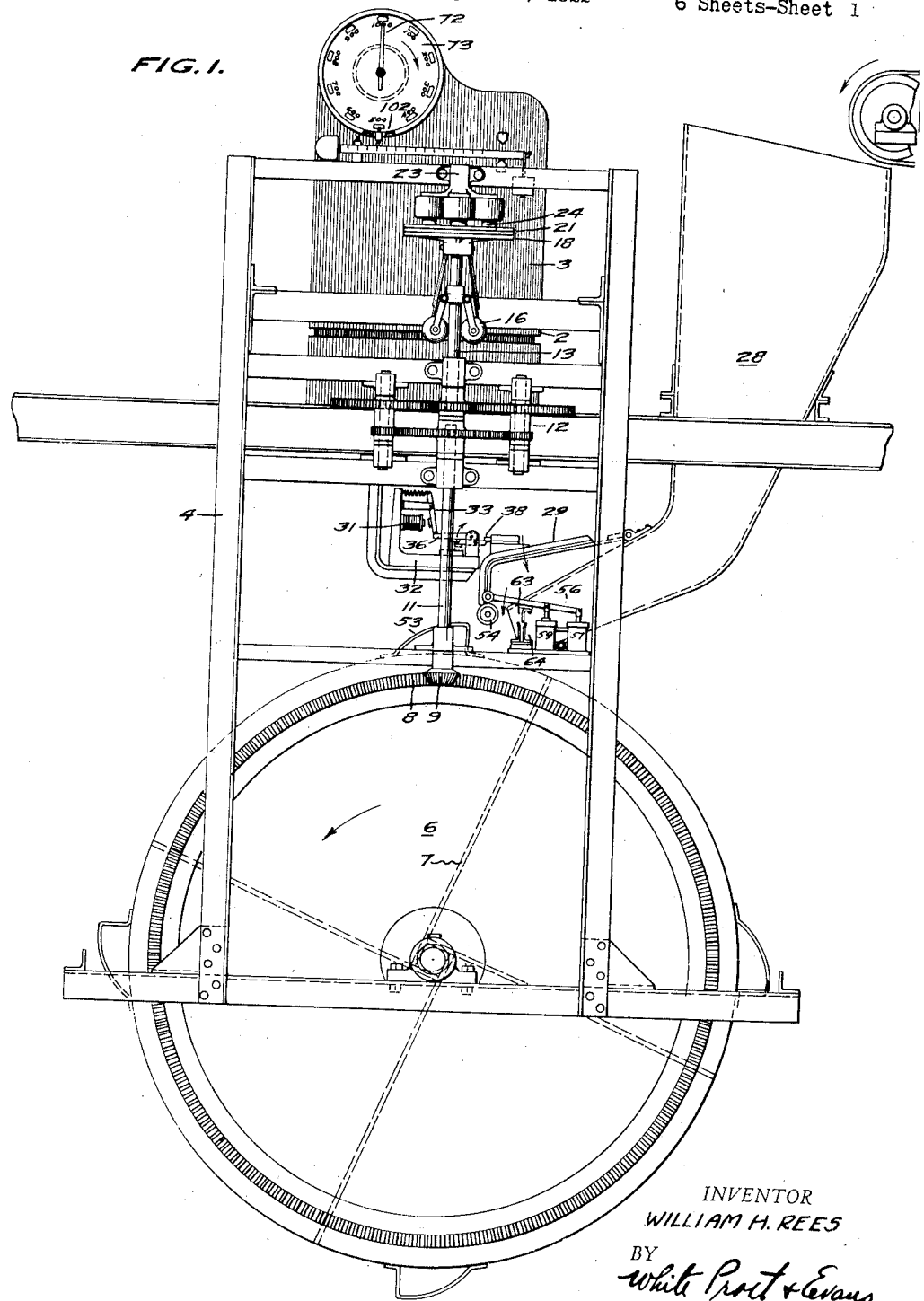
Figure 2:
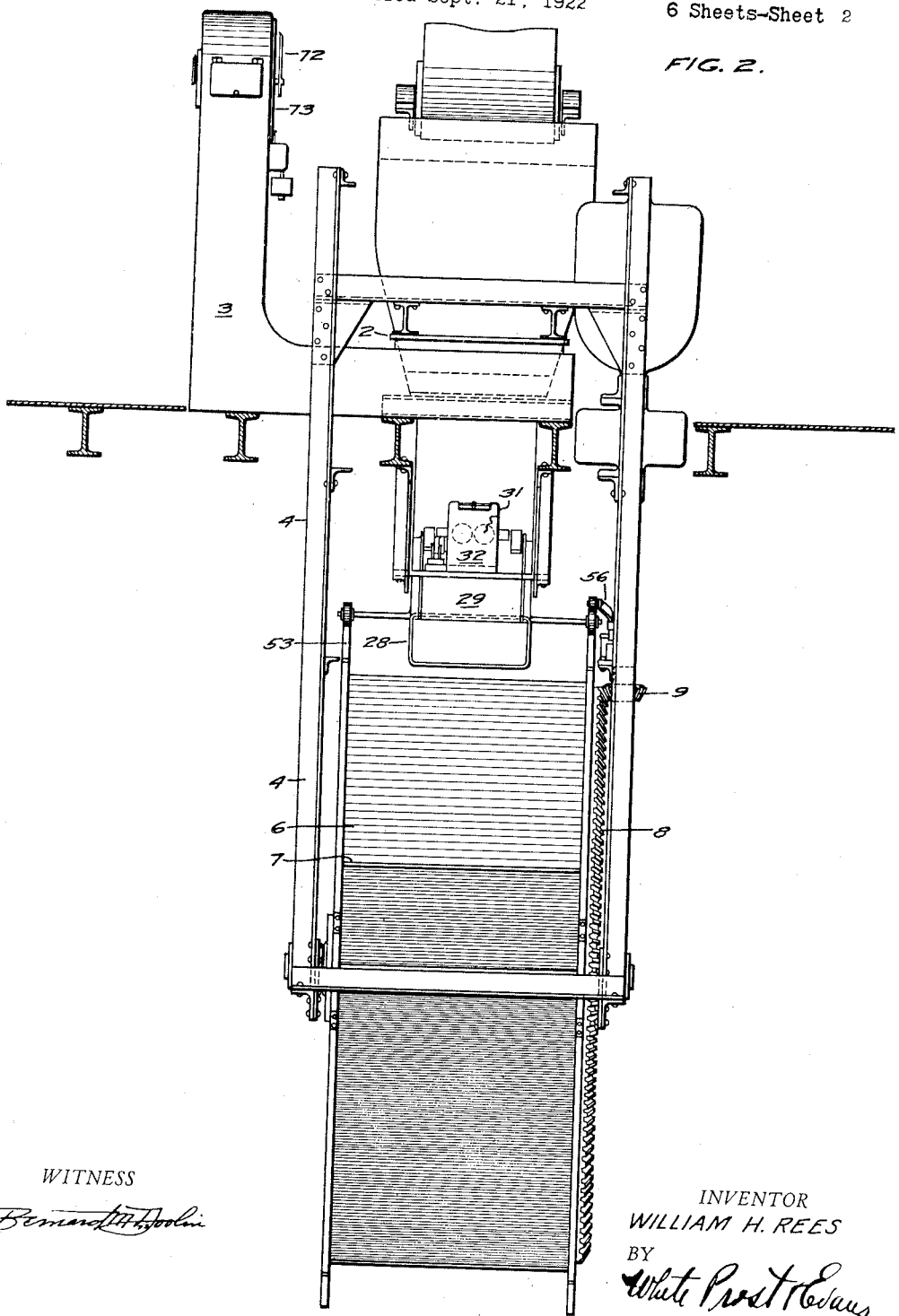
Figure 3:
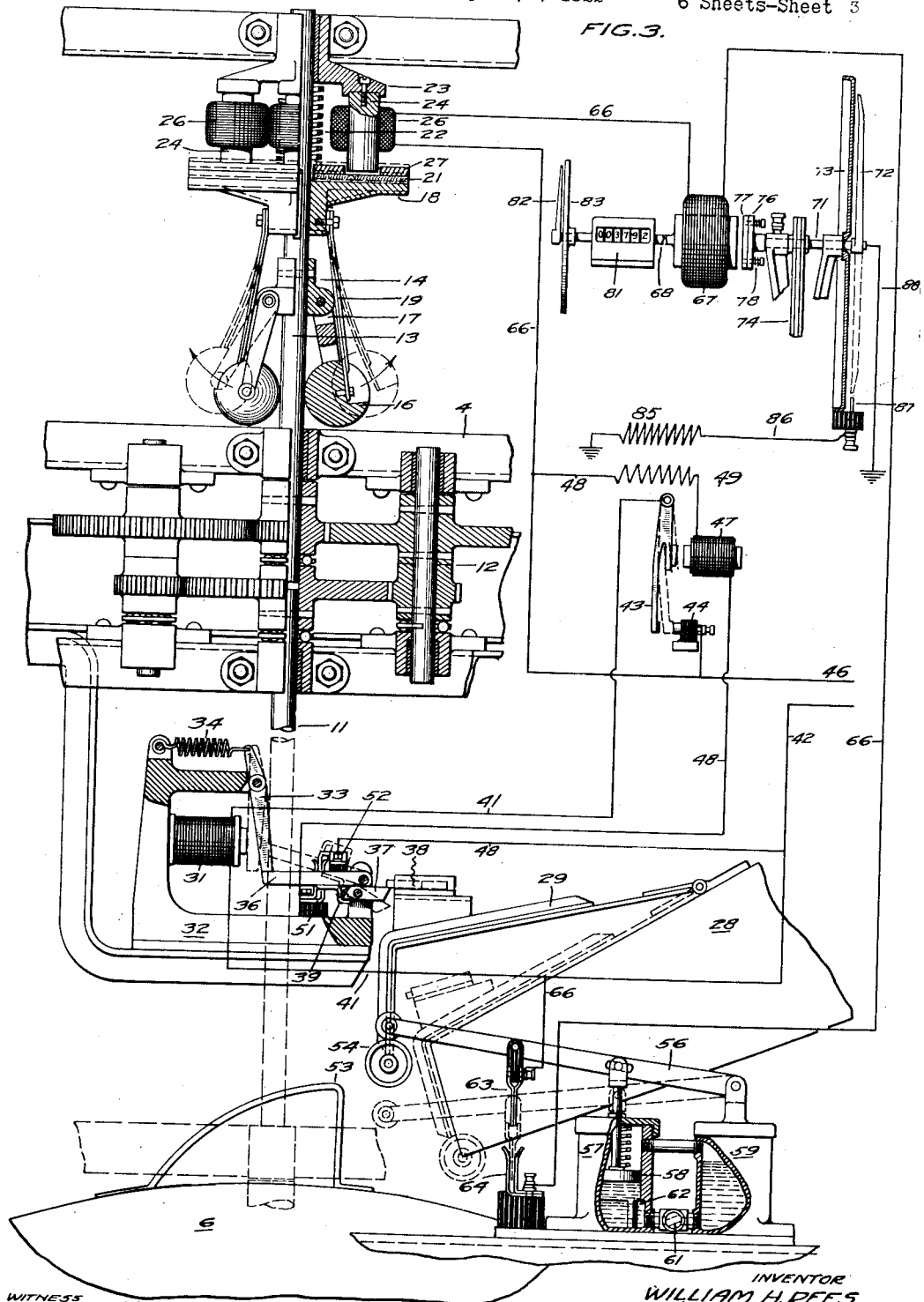
Figure 4:
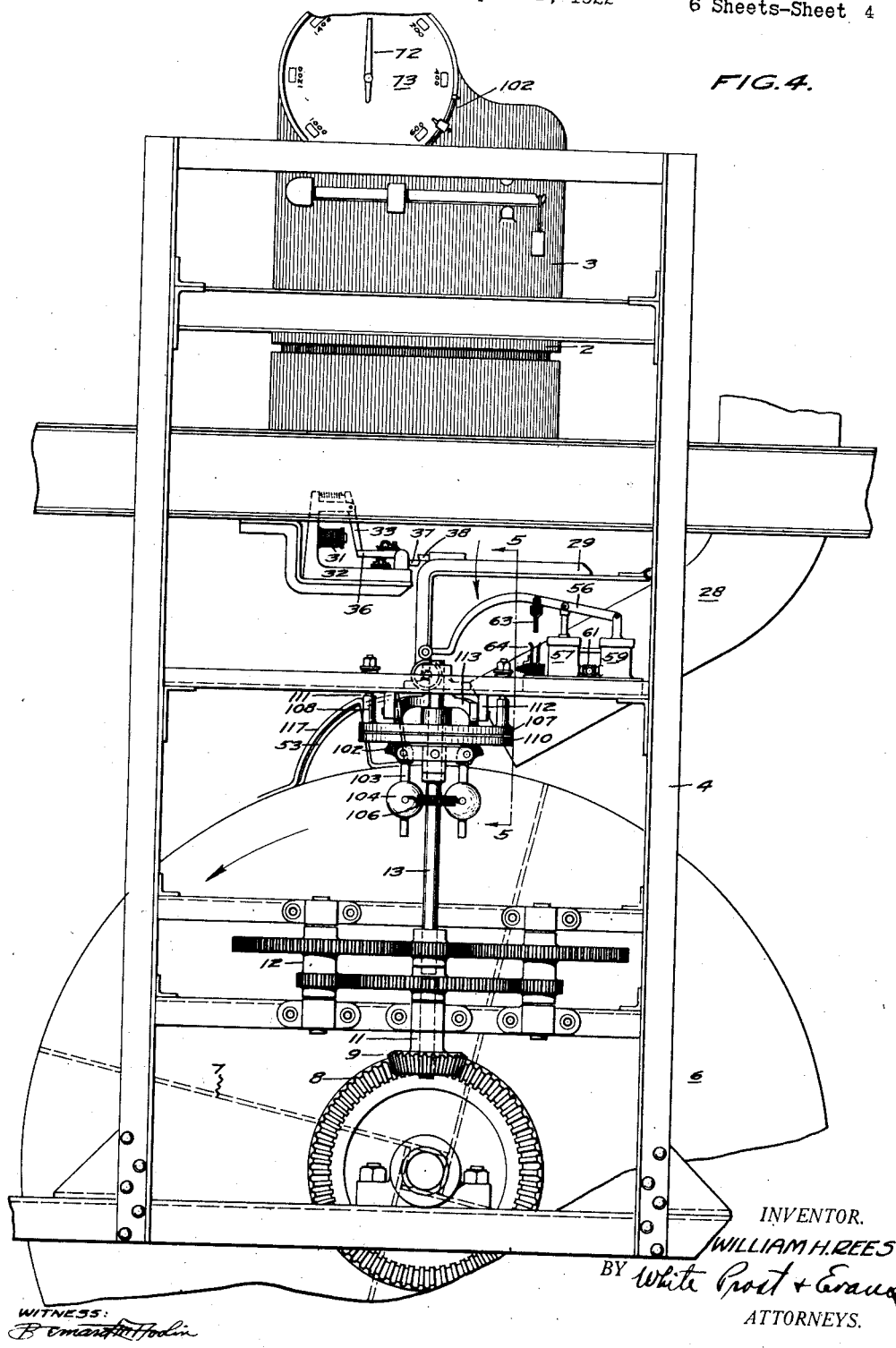
Figure 6:
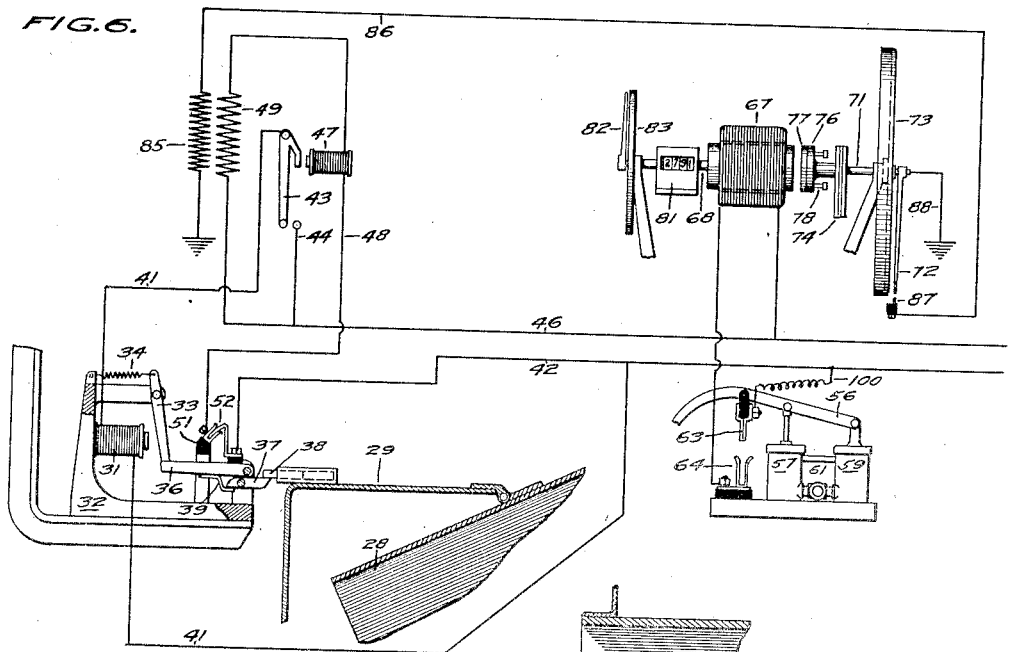
Figure 5:
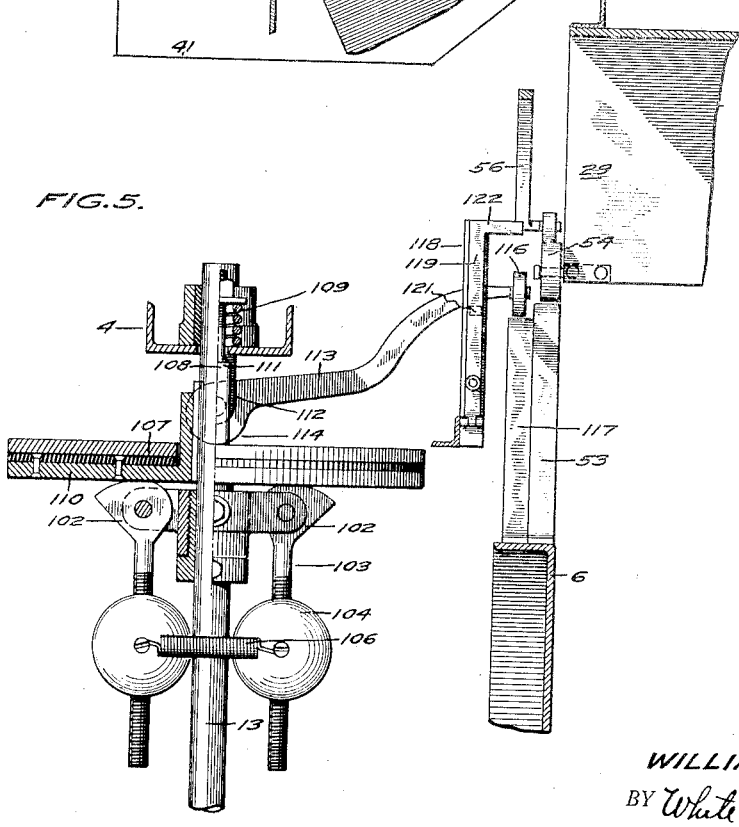
Figure 8:
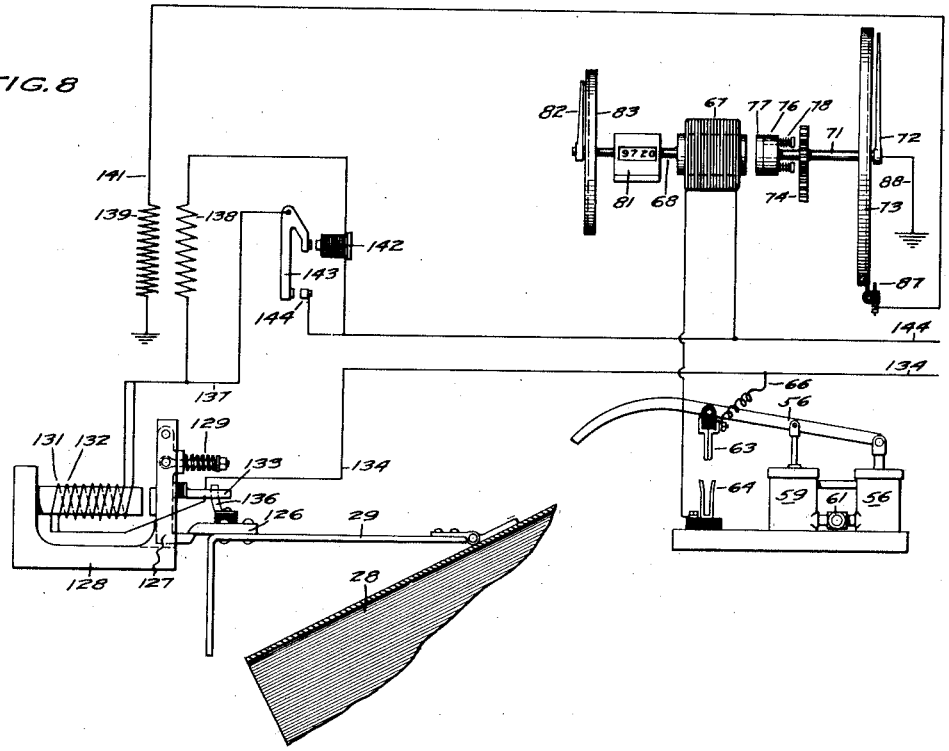
Figure 7:
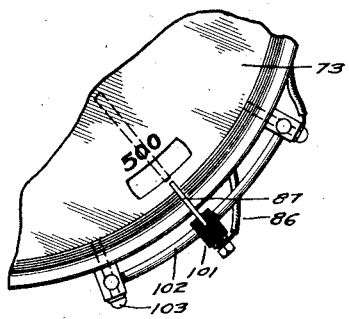

Referring to the drawings, Fig. 1 is a side elevation of the weighing apparatus. Fig. 2 is an elevation taken from a point to the left of Fig. 1. Fig. 3 is a view on a larger scale of portions of the apparatus in elevation and section and including a diagrammatical representation of the control circuits. Fig. 4 is a side elevation of a modified form of my weighing apparatus. Fig. 5 is a vertical sectional view showing a portion of the mechanism of the modified form of my device, taken in a plane indicated by the line 5—5 of Fig. 4. Fig. 6 is a view in elevation of portions of my modified apparatus, including a diagrammatical representation of the control circuits. Fig. 7 is a detail view on a larger scale of a portion of the control devices. Fig. 8 is a diagrammatical view showing an alternate arrangement of the circuits and gate releasing mechanism.

In the handling of copra, grain and many other commodities, it is frequently desirable to know exactly what amount of material passes a given point somewhere in the movement of the material between its receipt in the raw stage and its shipment as a finished product. At such a time the gross amount is usually the result of an approximation based on the totalized weight of successive loads, each the subject of special attention and recordation. Or it may be based on the totalized weights of predetermined unit loads plus the estimated overage or dribble load. This overage is estimated by determining thru experiments what is the mean overage for each load and multiplying this mean by the number of loads. Of course this method is only approximate and does not give results sufficiently accurate for valuable materials or for material the nature of which causes considerable fluctuation in the overage.

Where an attempt has been made to measure this overage more closely the operation of the weighing devices has been actuated or initiated by a mechanical connection with some part of the scale affected by the load thereon. However slight and delicate this connection is, it is defective, since even though in slight degree it is an outside influence on the scale beam and to that extent productive of error and uncertainty. The underlying purpose therefore of my invention is the provision of an apparatus with which the total quantity of material passing a given point, or the total quantity passing a given point in a given time may be accurately weighed and recorded, and that, without a mechanical connection of any sort with any portion of the weighing apparatus the movement of which is influenced by the load thereon.

In terms of broad inclusion, my invention comprises a rotary hopper wheel into which the material to be weighed is dumped by a chute fed by any suitable conveyor. The hopper wheel is so arranged that the presence of a load in one of the hoppers thereof tends to rotate the hopper to dumping position. It is supported on the platform of a suitable scale, arranged so that accession of the load moves an element which for convenience may be the pointer working over the face of the dial, to vary a gap in an electrical circuit, so that at a predetermined point corresponding to a unit load a spark is discharged across the gap. For purposes of explanation such unit load may be assumed to be 500 pounds, and the dial may be assumed to be graduated for 1000 pounds. The discharge of the spark, which occurs then when a unit load of 500 pounds has accumulated in the hopper, varies the electrical characteristics of certain related circuits and effects or initiates the operation of electrical devices which operate mechanism for closing a gate to interrupt the flow of material to the hopper. Concurrently with the closing of the gate, braking devices for controlling the rotation of the hopper under the influence of gravity are released and the hopper permitted to rotate to discharge its load. In the form of my invention illustrated in Fig. 1, I release the brake by electrical means and in that form illustrated in Fig. 4 I effect the release of the hopper wheel brake by mechanical means concurrently with the closing of the gate.

It is of course impossible to shut off instantaneously the flow of material to the hopper wheel, and therefore after the discharge of the spark has initiated the operation of mechanism to effect the closing of the gate, a small amount of the material in excess of the unit load, which may be under the gate when it starts to close, or in the air between the chute and the hopper, falls into the hopper in the brief interval following the discharge of the spark. This material constitutes the overage which hitherto it has been practically impossible to measure accurately. For a brief period after the total load, including the unit load and the overage, has fallen into the hopper, such total load is shown on the dial of the scale, and this brief period immediately precedes the dumping of the load. Assume that such total load as indicated on the dial is 517 pounds. During this brief period a circuit is closed thru a magnetic clutch interposed between the shaft of the pointer on the main dial, and a second shaft also having a pointer and a similar dial back to back with the main dial. A counter on this second shaft records the number of its revolutions.

The load now begins to discharge, accompanied of course by the recovery movement of the main dial shaft, which for the moment is connected with the second shaft. The second shaft is therefore carried forward an amount corresponding to such recovery movement, that is to say, to 517. At this point the clutch circuit is opened. With the dumping of the next total load, amounting say to 515 pounds, the second pointer is carried forward a corresponding amount and now indicates 32 pounds in its second revolution the counter indicating one complete revolution; it being remembered that the dial is graduated to 1000, and that while the main pointer starts at 0 with each load, the movements of the second pointer are additive. It is obvious then that at any time the total weight passed thru the machine is 1000 pounds, multiplied by the number of revolutions of the second pointer plus the reading on the second dial.

Concurrently with each movement of the hopper wheel to dump the load and position a new hopper under the chute, automatically operating means effects the application of the brakes to bring the hopper wheel to rest in a predetermined position, opens the gate to permit a new load to discharge into the hopper wheel, and restores certain of the circuits to their primary condition, so that a new cycle of operation may be begun. In order to prevent the hopper wheel from acquiring undue speed and running past the desired point of rest, centrifugally controlled means are provided for regulating its velocity, a brake being applied by such means, to keep the speed substantially constant irrespective of the load.

Supported on the platform 2 of a scale 3 of suitable construciton, is a frame work 4 upon which is rotatably mounted the hopper wheel 6, divided into compartments by radial walls 7. On the side of the hopper wheel is fixed a ring gear 8 in mesh with a pinion 9 fixed on the vertically disposed shaft 11. The shaft 11 is connected by the double gear train 12, with a shaft 13 upon which the centrifugally governed and brake mechanism is arranged. Fixed on the shaft 13 is a collar 14 upon which the centrifugal bails 16 are mounted by means of the links 17. Splined to the shaft 13 above the collar 14 is a brake disk 18 connected as best shown in Fig. 3 to the centrifugal balls by means of leaf springs 19. It will be observed that because of the gear train 12, the shaft 13 will revolve at relatively high speed with the turning of the hopper wheel, and that as the balls 16 are thrown outwardly the brake disk 18 is forced upwardly. Disposed loosely on the shaft 13 above the brake disk 18 is a second brake disk 21 adapted to be pressed frictionally against the disk 18 by means of the coil springs 22 interposed between the disk 21 and a bracket 23, fixed on a convenient portion of the frame 4. Fixed also on the bracket 23 are the cores 24 preferably four in number of electromagnets 26. The disk 21 comprises an armature for the four electromagnets and when the magnets are energized the disk 21 is freed from contact with the disk 18 so as to permit free rotation of the latter. With the deenergizing of the electromagnets the disk 21 is dropped into frictional engagement with the disk 18 and pressed thereagainst by the springs 22. The pressure of the spring 22 and the areas in frictional engagement are calculated to effect the proper braking of the hopper wheel so that it is brought to rest at the desired point. The speed of rotation of the hopper wheel is controlled by the centrifugal balls 16, which with excessive speed press the disk 18 upwardly against the disk 21 to reduce the velocity of rotation. A fiber plate 27 overlies the disk 21, and is apertured to receive the ends of the cores 24, which thus prevent the disk 21 from rotation when frictionally engaged by the disk 18.

Fixed on stable supports and projecting above the hopper wheel is a chute 28 into which the material to be weighed is introduced by any suitable means and which discharges into the hopper wheel. Flow of material from the chute is controlled by a gate 29 pivoted to the chute. Suitably arranged on fixed supports above the gate is mechanism for holding open the gate to permit material to flow into the hopper, and for releasing the gate to close it when the unit load has fallen into the hopper. A pair of electromagnets 31 are mounted on the bed plate 32, and an armature 33 is pivotally arranged adjacent the core. A spring 34 tends to hold the armature away from the core and in position to engage at its lower squared end the lever 36 which is pivoted on the bed plate. Pivoted also on the bed plate is the short lever 37, one arm of which engages the lever 36 quite close to its pivot, and the other arm of which is adapted to engage under the spring-pressed latch 38, mounted on the gate. Thus, movement of the armature 33, due to the energization of the magnet, permits the gate to fall, and when raised again the latch 38 catches over the lever 37 and holds the gate up until the next movement of the armature releases it. An arm 39 on the lever 36, and adapted to enclose the end of the lever 37, insures the positioning of the lever 36 when the gate is raised. The magnets 31 are energized thru the circuit 41, one side of which is connected into the supply line 42, and the other side of which includes a switch arm 43, the terminal 44 of which is connected to the other side 46 of the supply line. The circuit 41 is closed and opened thru the switch 43, movement of which is controlled by the electromagnet 47 in the circuit 48, one side of which is connected with the supply line 46 and includes the primary 49 of an induction coil. The other side of the circuit 48 is connected to the supply line 42, thru a knife switch, one element of which, 51, is mounted on the bed plate 32 and the other element of which, 52, is mounted on the lever 36.

In the position of parts shown in Fig. 3, that is with the gate 29 raised, the switch 51—52 is closed. With the energization of the magnets 31 and the consequent release of the lever 36 to drop the gate the switch 51—52 is opened, thus opening the circuit 48 so as to release the switch arm 43 and open the circuit 41. With the raising of the gate and the depression of the lever 36 the switch 51—52 is again closed thus restoring the circuit to original condition.

With the rotation of the hopper wheel an empty compartment comes into position below the chute, and means are provided for raising the gate and braking the hopper wheel to bring it to rest in the proper position. Cams 53 are arranged about the circumference of the hopper wheel, preferably in pairs, with one on each side of the wheel. As the wheel rotates the cams engage rollers 54 on the gate lifting it so that the latch 38 engages the trigger mechanism including the levers 37 and 36. Since it is desirable that the material under the gate and in the air shall have time to come to rest on the hopper wheel until all vibration, due to impact of large pieces dies down, means are provided for delaying the beginning of the rotation of the wheel and the recordation of the weight therein for a brief interval after the closing of the gate occurs.

Resting on the roller 54 on one side of the hopper wheel is an arm 56 pivoted at one end on the oil reservoir 57 and intermediate its ends, connected to the piston 58 arranged in the dash pot 59. The dash pot 59 is connected to the reservoir 57 by a passage controlled by the valve 61, so that the speed of action of the dash pot piston may be adjusted. At the bottom of the dash pot the bore is widened out by circumferentially disposed grooves 62, so that when the piston reaches this portion, the oil is suddenly bypassed about the piston, permitting it to descend quickly the remainder of its stroke. This is for the purpose of securing a quick contact between switch points 63 and 64 mounted respectively on the arm 56 and adjacent the dash pot. The switch 63—64 controls the circuit 66, one side of which is connected into the supply line 42 and the other side of which connects in series the electromagnet 67, which controls the recording mechanism, and the electromagnets 26 which control the brake, finally connecting into the supply line 46.

With the dropping of the gate to shut off the flow of material, the dash pot after a brief interval permits the closing of the circuit 66 thus energizing the electromagnets 26 which pick up the friction disk 21 and permit the load in the hopper to effect its rotation. As the rotation of the hopper moves the cams 53 into position to raise the gate, the arm 56 is also raised and the circuit 66 broken. This allows the spring 22 to function and the hopper wheel is brought to rest with the cams 53 just in advance of the rollers 54 as shown in Fig. 3.

During the interval just spoken of when the total load is in the hopper, and vibration has ceased, the weight of the material is recorded. The core of the magnet 67 comprises a shaft 68 axially alined with the shaft 71 upon which the main pointer 72 is fixed for rotation about the main dial 73 of the scale. The shaft 71 is rotated by the weighing mechanism in a well known manner by the rack 74. Fixed on the shaft 71 is a flange 76 on which is mounted an armature plate 77, resiliently held against the flange 76, by springs 78 mounted on studs fixed in the armature plate and extending thru the flange. This mechanism constitutes a magnetic clutch between the shaft 68 and the shaft 71, actuated with the closing of the circuit 66, and released with the breaking of that circuit. On the other end of the shaft 68 which is reduced in diameter after leaving the coil 67, is mounted a counter 81 for indicating the number of revolutions of the shaft, and a pointer 82 moving about the second dial 83. This dial is similar to the main dial 73 and conveniently may have 1000 divisions. When the entire load has fallen into the hopper and is indicated on the dial 73 by a displacement of the pointer 72, the closure of the circuit 66 actuates the magnetic clutch to connect the two shafts 68 and 71. If this is the first load thru the machine the second pointer is at 0. As the load dumps, the recovery of the shaft 71 is accompanied by an equivalent forward rotation of the shaft 68. With the pointer 72 back at zero, the pointer 82 has been moved forward to a point indicating the entire weight of the load, that is to say the pointer 82 has been moved forward about the dial 83 an amount equal to the recovery movement of the main dial shaft. With the accession of a second load into the hopper wheel the pointer 72 is correspondingly deflected and after it has come to rest to indicate the total load in the hopper, the magnetic clutch picks up the pointer 82, which, with the recovery of the pointer 72, is again moved forwardly an additional amount equal to the second load. If we assume that the dials are graduated for a total of 1000 pounds, the weight which has passed thru the machine may be determined at any time by multiplying the number of revolutions as shown in the counter 81 by 1000 and adding the amount indicated by the position of the pointer 82.

In some weighing machines the dial does not indicate the full capacity of the machine, but for example, 200 pounds, and if weights in excess of that amount, but for example not to exceed 1000 pounds, are to be handled, provision is made for loading the beam. In such case both dials 73 and 83 are graduated to 200, and the pointer on the main dial does not move until the beam load is exceeded. With such a mechanism a counter is provided for indicating the number of loads dumped. If we assume 400 pounds as the load on the scale beam, and that the mechanism is arranged so that the gate is tripped when the pointer 72 indicates 100 pounds on the main dial then of course the total weight of material passing thru the machine is found by multiplying the total number of loads dumped by 400, and adding the actual reading of the dial 83, and 200 times the reading of the counter 81. It will be understood, of course, in the last example, that the amounts determinable from the counter 81 and the dial 83 are in excess of the sum of the beam loads, which are not visibly indicated as such.

A small amount of current is normally flowing thru the circuit 48, but due to the impedance of the primary coil 49 therein, the current is insufficient to energize the electromagnet 47. Means are provided for altering the current flow in the circuit 48 so that the electromagnet 47 is energized to start the train of operation described when the pointer 72, under the influence of the load in the hopper, has been displaced to a predetermined point. Associated with the primary coil is a secondary coil 85 grounded at one side and on the other connected by a conductor 86 to a stud 87 adjustably arranged adjacent the periphery of the dial 73. The position of the stud is such that the pointer 72 in its turning movement, will miss it by a short gap. The pointer also is connected to a ground by the conductor 88. The proportions between the coils 49 and 85 are such that with a voltage of 110 in the circuit 48, a current of 2000 volts will be induced in the secondary coil 85.

The stud 87 is mounted on a block 101 adjustable on an arcuate bar 102 which in turn is adjustable about the periphery of the main dial 73 by means of screws 103 set in threaded apertures spaced about the dial. An approximate setting is secured by properly placing the arcuate elements, and exact setting is then achieved by movement of the stud thereon. Under the influence of the weight in the hopper, the pointer 72 is displaced about the dial 73 until it reaches a point radially adjacent the stud 87. At this moment a spark is discharged across the two electrodes, comprising the pointer and the stud 87, causing a momentary surge of current thru the primary coil 49 sufficient to energize the electromagnet 47, thus actuating the switch 43 and closing the circuit 41 so that the gate is released. In the mechanism first described in connection with a dial graduated to 1000, the stud electrode is set opposite a dial reading corresponding to the unit load, that is, 500 in the example assumed. In the mechanism described in connection with a beam load of 400 pounds and a dial graduated to 200, the stud electrode is set opposite a dial reading of 100. In either case, the discharge of the spark across the gap, initiates the cycle of operation, which then automatically proceeds to a point at which all circuits and mechanisms are restored to primary condition, except the second pointer and the counter 81 which together indicate the totalized value of the effect thereon of each successive load. No mechanical or frictional resistance is placed on any portion of the weighing mechanism affected by the load thereon and extreme accuracy and dependability are characteristic of my device.

In Figs. 4, 5 and 6, I have shown a modified form of my weighing machine which differs from that just explained chiefly in the fact that the brake for stopping the hopper wheel is controlled by mechanical means instead of electrical means. The automatic speed controlling devices are also somewhat different in detail. Since the magnets 26 are omitted, the circuit 66 is correspondingly modified and the magnet 67 is connected in series with the dash pot controlled switch 63—64 and across the two sides of the supply line, the circuit 100 being shown in Fig. 6 and corresponding to circuit 66 of Fig. 3 with the exceptions noted. Splined on the shaft 13 is a friction plate 110 on the under surface of which bear the cams 102, forming part of the arms 103, on which the centrifugal balls 104 are adjustably mounted. A spring 106 tends to hold the balls together. Centrifugal action of the balls rotates the cams 102 and raises the friction disk 110 into engagement with the friction disk 107 non-rotatably supported above the disk 110 and thus effects the automatic governing of the velocity of the hopper wheel. The friction disk 107 is supported from any suitable portion of the frame 4 by means of two studs 108. A spring 109 is interposed between the frame 4 and the nutted end of the stud; and a shoulder 111 formed on the plate 107 limits the upward movement of the disk 110. after it has been engaged by the disk Means are provided for pressing the disk 107 downwardly against the disk 110, against the resistance of the spring 109, to bring the hopper wheel to a halt in the desired position to receive a load.

Pivotally mounted on lugs 112 spaced on either side of the studs 108 are the bifurcated ends of the lever 113. The bifurcated ends of the lever are formed to provide cams 114 engaging the friction plate 107, and the other end of the lever is provided with a roller 116 adapted to engage a cam 117 arranged on the hopper wheel by the side of cam 53. Mounted on a member 118 fixed on a convenient portion of the frame is an arm 119, provided with a beveled lug 121, which projects thru an aperture in the member 118 in such position that when the arm 113 has been raised by the action of the cam 117 it strikes the beveled portion of and latches over the lug 121, and is held in this position until the lug is withdrawn by movement of the arm of which it forms a part. The arm 119 is so formed as to provide a portion 122 lying in the path of movement of the dash pot controlled arm 56. Let us assume that the parts are in the position shown in Fig. 5, and that a load is flowing into one of the hoppers of the hopper wheel. With the closing of the gate, the arm 56 begins its descent being retarded as previously explained by the dash pot 59. As the arm 56 falls it encounters the offset portion of the arm 119 pushing the arm back and withdrawing the supporting lug 121 from the arm 113 which is thereupon allowed to fall thus effecting the release of the friction plate 107 from the cams 114. This permits the hopper wheel to start rotating under the influence of the load therein and such rotation is regulated by centrifugal action of the balls 104 as already explained. As the roller 116 rides up on the next succeeding cam 117, which takes place while the gate is being raised for a new load, the cams 114 effect a braking pressure between the plates 107 and 110 sufficient to bring the hopper wheel to rest at the desired point. As the arm 113 rises it latches over the lug 121 and is held in the raised position until again released in the next cycle of operation.

In Fig. 8 I have shown a modified arrangement of the gate releasing mechanism and the controlling circuits, in which the gate 29 is provided with an arm 126 adapted to latch over the end of the L-shaped lever 127 pivoted in the bed plate 128. The lever 127 is resiliently retained in the position shown by the spring 129, and is adapted to be drawn backwardly to release the gate by an electromagnet comprising preferably two coils 131 and 132, both of which are connected on one side to one of the switch studs 133, the other stud being connected to one side 134 of the main line. A blade 136 on the gate closes this switch when the gate is open and is withdrawn to open the switch when the gate falls. On the other side the two coils 131 and 132 are both connected to a circuit 137 including a coil 138 inductively coupled to a coil 139 in the circuit 141. The circuit 137 also includes the relay 142 for operating the switch 143, thru which both coils 131 and 132 are connected to the other side 144 of the main line, the circuit 137 also being connected into this side as shown. The operation of this form of my device is quite similar to the other forms, except that when the surge of current thru the relay following the discharge of the spark across the gap closes the switch 143 the relay coil and coil 138 are shorted, the major portion of the current passing directly to the two coils 131 and 132, but sufficient going thru the relay to keep the switch 143 closed. The drawing over of the lever 127 releases the gate which in falling opens the switch 133, breaking both short and relay circuits and permitting the switch 143 to open and the arm 127 to swing forward in position to catch the gate when it rises. With the rising of the gate and the closing of the switch 133, the circuits are restored to first condition.

I claim:

1. In a system for controlling an electrical translating device, an inductive impedance in circuit with said device and serving to limit the flow of current therethrough, and means for reducing said impedance, comprising a circuit inductively coupled to said impedance, and having a gap across which a spark may be made to pass.

2. In a system for controlling the flow of current from a source to an electrical translating device, an inductive impedance permanently inserted between the source and the device and serving to limit the flow of current therethrough, and means for reducing said impedance, comprising a circuit inductively coupled to said impedance, and arranged to be short circuited by the aid of a spark discharge across a gap in the circuit.

3. In a system for controlling the flow of current from a source to an electrical translating device, an inductive impedance permanently inserted between the source and the device and serving to limit the flow of current therethrough, and means for reducing said impedance, comprising a circuit inductively coupled to said impedance, means forming a gap in said circuit, and means for varying the length of the gap so as to cause a discharge across the gap and thereby to short circuit the inductively coupled circuit.

4. In a system for controlling the operation of mechanism, an electrical translating device arranged to initiate the operation of said mechanism, a switch controlling the current flow in said device, electroresponsive means for operating the switch, and means for varying the current flow in said electroresponsive means, comprising an inductive impedance limiting the flow of current in said means, a circuit inductively coupled to said impedance, means forming a gap in said circuit, and means for varying the length of the circuit to produce a spark discharge across said gap and thus to short circuit the inductively coupled circuit.

5. In a system for electrically controlling the operation of mechanism, a circuit including a translating device for initiating the operation of said mechanism and a switch, a second circuit including a translating device for operating said switch, means for producing a current flow in said second circuit and when the switch is closed in said first circuit, a third circuit inductively coupled to said second circuit and including a gap, and unit indicating means for varying said gap whereby at a predetermined unit value a spark is discharged thereacross.

6. In a system for electrically controlling the operation of mechanism, a circuit including a translating device for initiating the operation of said mechanism and a switch, a second circuit including a translating device for operating said switch, means for producing a current flow in said second circuit and when the switch is closed in said first circuit, a third circuit inductively coupled to said second circuit and including a gap, means for varying said gap to permit the discharge of a spark thereacross, and means operating in time with the operation of said mechanism for opening said second circuit.

7. In a system for electrically controlling the operation of mechanism for evaluating or giving effect to quantities to be indicated or measured, a circuit including a translating device for initiating the operation of said mechanism and a switch, a second circuit including a translating device for operating said switch, means for producing a current flow in said second circuit and when the switch is closed in said first circuit, a third circuit inductively coupled to said second circuit, an electrode in said third circuit varying in position with the value of the quantities to be indicated or measured, a second electrode in said third circuit separated from said first electrode by a gap varying with the position of said first electrode whereby at a predetermined value of the quantity to be indicated or measured a spark is discharged between said electrodes.

8. In combination with an apparatus for evaluating units of measurement, an electrode varying in position with the value of said units, a second electrode separated from said first electrode by a gap varying with the position of said first electrode, a circuit including said electrodes, a second circuit inductively coupled to said first circuit and including a translating device, mechanism correlated with said apparatus, and means controlled by said translating device for initiating the operation of said mechanism.

9. In combination with an apparatus having an element movable in accordance with variable factors related to the operation of the apparatus, an electrode arranged on said movable element, a second electrode separated from said first electrode by a variable gap, a circuit including said electrodes, a second circuit inductively coupled to said first circuit and including a translating device, mechanism correlated with said apparatus, and means controlled by said translating device for initiating the operation of said mechanism.

10. In combination with an apparatus having an element movable in accordance with variable factors related to the operation of the apparatus, an electrode arranged on said movable element, a second electrode separated from said first electrode by a variable gap, a circuit including said electrode, a second circuit inductively coupled to said first circuit and including a translating device, mechanism correlated with said apparatus, means controlled by said translating device for initiating the operation of said mechanism, and means operating in time with said mechanism for opening said second circuit.

11. In combination with an apparatus having an element movable in accordance with variable factors related to the operation of the apparatus, an electrode arranged on said movable element, a second electrode separated from said first electrode by a variable gap, a circuit including said electrode, a second circuit inductively coupled to said first circuit and including a translating device, mechanism correlated with said apparatus, means controlled by said translating device for initiating the operation of said mechanism, recording devices correlated with said mechanism, a control circuit for said recording device, and means operating in time with said mechanism for closing and opening said control circuit.

12. In combination with an apparatus having an element movable in accordance with variable factors related to the operation of the apparatus, an electrode arranged on said movable element, a second electrode separated from said first electrode by a variable gap, a circuit including said electrodes, a second circuit inductively coupled to said first circuit and including a translating device, mechanism correlated with said apparatus, a third circuit including a switch controlled by the translating device in said second circuit, and a translating device in said third circuit for initiating the operation of said mechanism.

13. In combination with a weighing machine having an element movable in accordance with the load thereon, an electrode arranged on said movable element, a second electrode separated from said first electrode by a variable gap, a circuit including a coil and said electrodes, mechanisms for loading and unloading said machine, a second circuit including a switch and a translating device for initiating the operation of said mechanisms, a third circuit inductively coupled to said first circuit and including a translating device for controlling the operation of said switch and means for producing a current flow in said third circuit and when said switch is closed in said second circuit.

14. In combination with a weighing machine having an element movable in accordance with the load thereon, an electrode arranged on said movable element, a second electrode separated from said first electrode by a variable gap, a circuit including a coil and said electrodes, mechanisms for loading and unloading said machine and for recording the weight of each load, a second circuit including a switch and a translating device for initiating the operation of said mechanisms, a third circuit inductively coupled to said first circuit and including a translating device for controlling the operation of said switch, and means for producing a current flow in said third circuit and when said switch is closed in said second circuit.

15. In combination with a weighing machine having an element movable in accordance with the load thereon, an electrode arranged on said movable element, a second electrode separated from said first electrode by a variable gap, a circuit including a coil and said electrodes, mechanisms for recording the weight of the loads placed on said weighing machine, a second circuit including a switch and a translating device for initiating the operation of said mechanisms, a third circuit inductively coupled to said first circuit and including a translating device for controlling the operation of said switch, and means for producing a current flow in said third circuit and when said switch is closed in said second circuit.

16. In combination with a weighing machine having an element movable in accordance with the load thereon, an electrode arranged on said movable element, a second electrode separated from said first electrode by a variable gap, a circuit including a coil and said electrodes, mechanisms for loading and unloading said machine, a second circuit including a switch and a translating device for initiating the operation of said mechanisms, a third circuit inductively coupled to said first circuit and including a translating device for controlling the operation of said switch, means for producing a current flow in said third circuit and when said switch is closed in said second circuit, and means operating in time with said mechanisms for opening said third circuit.

17. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a second circuit including a switch and a translating device for controlling said feed controlling means, a third circuit inductively coupled to said first circuit and including a translating device for controlling the operation of said switch, and means for producing a current flow in said third circuit and when said switch is closed in said second circuit.

18. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, and electrical devices inductively coupled to said circuit for controlling said feed controlling means.

19. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a control circuit for said feed controlling means, and means operable by the production of a spark across said gap for varying an electrical characteristic of the control circuit.

20. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a control circuit for said feed controlling means, and means operable by the production of a spark across said gap for varying the reactance of the control circuit.

21. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a control circuit for said feed controlling means, means operable by the production of a spark across said gap for varying an electrical characteristic of the control circuit, and centrifugally operated means for controlling the pivotal movement of said hopper.

22. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a control circuit for said feed controlling means, means operable by the production of a spark across said gap for varying an electrical characteristic of the control circuit, and means for adjusting said second electrode whereby said spark will occur when a predetermined load is in said hopper.

23. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for recording the weight of each load, a control circuit for said feed controlling means, a control circuit for said weight recording means and controlled by movement of said hopper, and means operable by the production of a spark across said gap for varying the reactance of the feed control circuit.

24. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged and adapted to be rotated to dumping position by said load, means for controlling the feed of material into said hopper, means for preventing turning of said hopper controlled by said feed controlling means, a control circuit for said feed controlling means, means operable by the production of a spark across said gap for varying an electrical characteristic of the control circuit, means for recording the weight of each load, a control circuit for said weight recording means, and means for closing the weight recording means control circuit a predetermined interval after the stopping of the feed of material to said hopper.

25. In combination with a weighing machine having an element movable in accordance with the load thereon, an electrode arranged on said movable element, a second electrode separated from said first electrode by a variable gap, a circuit including a coil and said electrodes, a hopper to receive said and load pivotally arranged on said machine and adapted to be rotated to dumping position by said load, means for controlling the feed of material into said hopper, means for preventing turning of said hopper controlled by said feed controlling means, a control circuit for said feed controlling means, means operable by the production of a spark across said gap for varying an electrical characteristic of the control circuit, means for recording the weight of each load, a control circuit for said weight recording means, and means for closing the weight recording means control circuit immediately before the dumping of said load.

26. In combination with a weighing machine having an element movable in accordance with the load thereon, an electrode arranged on said movable element, a second electrode separated from said first electrode by a variable gap, a circuit including a coil and said electrodes, a hopper to receive said load pivotally arranged on said machine and adapted to be rotated to dumping position by said load, means for controlling the feed of material into said hopper, means for preventing turning of said hopper controlled by said feed controlling means, a control circuit for said feed controlling means, means operable by the production of a spark across said gap for varying an electrical characteristic of the control circuit, means for recording the weight of each load, a control circuit for said weight recording means, and means for closing the weight recording means control circuit a predetermined interval after the stopping of the feed of material to said hopper and before the dumping of said load and for opening said weight recording means control circuit after the load has been dumped.

27. In a device of the class described a hopper wheel comprising a plurality of hoppers and adapted to be rotated to dump hoppers and adapted to be rotated to dump the load from each hopper by the load therein, means for feeding material into the upper hopper, means for preventing rotation of the wheel while receiving a load, means actuated by the weight of a predetermined portion of the total load for stopping the flow of said material and releasing said rotation preventing means, and means actuated by the rotation of the wheel for stopping its rotation and reestablishing the flow of material thereto.

28. In a device of the class described a hopper wheel comprising a plurality of hoppers and adapted to be rotated to dump the load from each hopper by the load therein, means for feeding material into the upper hopper, means for preventing rotation of the wheel while receiving a load, means actuated by the weight of a predetermined portion of the total load for stopping the flow of said material and releasing said rotation preventing means, means actuated by the rotation of the wheel for stopping its rotation and reestablishing the flow of material thereto, and means for indicating the weight of the material passing thru said hopper wheel.

29. In a device of the class described a hopper wheel comprising a plurality of hoppers and adapted to be rotated to dump the load from each hopper by the load therein, means for feeding material into the upper hopper, means for preventing rotation of the wheel while receiving a load, means actuated by the weight of a predetermined portion of the total load for stopping the flow of said material and releasing said rotation preventing means, means actuated by the rotation of the wheel for stopping its rotation and reestablishing the flow of material thereto, and centrifugal means for controlling the velocity of said wheel.

30. In a device of the class described a hopper wheel comprising a plurality of hoppers and adapted to be rotated to dump the load from each hopper by the load therein, a gate for controlling the flow of material into said hoppers, a brake operatively connected to said wheel, means actuated by the weight of a predetermined portion of the total load for closing the gate and releasing said brake, and means actuated by the rotation of the wheel for applying the brake to stop the wheel and opening said gate.

31. In a device of the class described a hopper wheel comprising a plurality of hoppers and adapted to be rotated to dump the load from each hopper by the load therein, a gate for controlling the flow of material into said hoppers, a brake operatively connected to said wheel, means actuated by the weight of a predetermined portion of the total load for closing the gate and releasing said brake, means actuated by the rotation of the wheel for applying the brake to stop the wheel and opening said gate, and centrifugal means for operating said brake to regulate the velocity of said wheel.

32. In a device of the class described a hopper wheel comprising a plurality of hoppers and adapted to be rotated to dump the load from each hopper by the load therein, a gate for controlling the flow of material into said hoppers, a control circuit for said gate, and means the operation of which is initiated by the discharge of a spark between relatively movable elements of the device for controlling said control circuit.

33. In a weighing machine having a load receiver, an element movable in accordance with the load in the receiver, a second element the position of which relative to said movable element corresponds to the position of the latter when a predetermined unit load is on the machine, and electrical devices operative by a spark discharge between said elements, for controlling the operation of said machine.

34. In a weighing machine having a load receiver, an element movable in accordance with the load in the receiver, a second element the position of which relative to said movable element corresponds to the position of the latter when a predetermined unit load is on the machine, a gate for controlling the flow of material to said machine, means for dumping the load from said machine, and electrical devices operative by a spark discharge between said elements for closing the gate and effecting the operation of said dumping means.

35. In a weighing machine, a hopper wheel comprising a plurality of hoppers and adapted to be rotated to dump the load by the weight of the load therein, a gate for controlling the flow of material into said hoppers, a brake operatively connected to said wheel, an element movable in accordance with the load in the hopper wheel, a second element the position of which relative to said movable element corresponds to the position of the latter when a predetermined unit load is on the machine, and electrical devices operative by a spark discharge between said elements for closing said gate and releasing said brake.

36. In a weighing machine, a hopper wheel comprising a plurality of hoppers and adapted to be rotated to dump the load by the weight of the load therein, a gate for controlling the flow of material into said hoppers, a brake operatively connected to said wheel, an element movable in accordance with the load in the hopper wheel, a second element the position of which relative to said movable element corresponds to the position of the latter when a predetermined unit load is on the machine, electrical devices operative by a spark discharge between said elements for closing said gate and releasing said brake, and means operated after the closing of said gate and prior to the dumping of the load for indicating the total load in said hopper wheel.

37. In a weighing machine, a hopper wheel comprising a plurality of hoppers and adapted to be rotated to dump the load by the weight of the load therein, a gate for controlling the flow of material into said hoppers, a brake operatively connected to said wheel, an element movable in accordance with the load in the hopper wheel, a second element the position of which relative to said movable element corresponds to the position of the latter when a predetermined unit load is on the machine, electrical devices operative by a spark discharge between said elements for closing said gate and releasing said brake, and means operated with the turning of the hopper wheel for raising said gate and applying said brake.

38. In a weighing machine, a hopper wheel comprising a plurality of hoppers and adapted to be rotated to dump the load by the weight of the load therein, a gate for controlling the flow of material into said hoppers, a brake operatively connected to said wheel, an element movable in accordance with the load in the hopper wheel, a second element the position of which relative to said movable element corresponds to the position of the latter when a predetermined unit load is on the machine, electrical devices operative by a spark discharge between said elements for closing said gate and releasing said brake, and means operated in time with the rotation of the hopper wheel for raising said gate, applying said brake, and restoring said electrical devices to primary position.

39. In a machine of the class described having a load receiver, an element movable in accordance with the load in said receiver and comprising an electrode, an element comprising a second electrode adjustable adjacent the path of movement of said first element, and electrical devices for causing a spark discharge between said elements when said first element moves to a predetermined position.

40. In a weighing machine, a rotary hopper wheel, a shaft fixed for rotation with said hopper wheel, a non-rotatable disk, a disk fixed for rotation with said shaft, centrifugally operated means for pressing said rotary disk against the non-rotary disk, and means operated in time with the turning of said hopper wheel for pressing the non-rotary disk against the rotary disk.

41. In a device of the class described a hopper wheel comprising a plurality of hoppers and adapted to be rotated to dump the load from each hopper by the load therein, a gate for controlling the flow of material into said hoppers, a non-rotatable disk, a disk fixed for rotation with said hopper wheel, means operated in time with the turning of said hopper wheel for opening said gate and for passing one of said disks against the other to halt the rotation of the hopper wheel, and means operative when a unit load is in said hopper wheel for closing said gate and releasing the pressure between said disks.

42. In a system for controlling an electrical translating device, an impedance in circuit with said device and serving to limit the flow of current therethrough, means for varying said impedance so as to reduce it and thereby to increase the flow of current, and a circuit arranged to be bridged across said impedance in response to this increase in current.

43. In a system for controlling an electrical translating device, an inductive impedance in circuit with said device and serving to limit the flow of current therethrough, a coil inductively coupled to said impedance, means forming a gap in circuit with the coil and adapted to permit a spark discharge across it so as to complete the coil circuit and thereby to reduce the impedance, a circuit shunting the impedance, and means responsive to the increased flow of current in said impedance due to its reduction, for closing this shunting circuit.

44. In a system for controlling the operation of mechanism, an electrical translating device arranged to initiate the operation of said mechanism, an impedance in circuit with said device and serving to limit the flow of current therethrough, means for varying said impedance so as to reduce it and thereby to increase the flow of current, and a circuit arranged to shunt said impedance in response to the current increase.

45. In a system for controlling the operation of mechanism, an electrical translating device arranged when sufficiently energized to initiate the operation of said mechanism, an inductive impedance limiting the flow of current through the device, a coil inductively coupled to said impedance, means forming a gap of variable length in circuit with said coil, whereby a spark discharge may be produced across the gap and thereby a reduction in the impedance with consequent increase in current through the device, means whereby said gap is shortened in response to the occurrence of a predetermined condition in the mechanism, a shunt circuit around the impedance, and an electromagnetically operated switch arranged to complete said shunt circuit in response to the increase in current.

46. In a weighing machine, a load receiver arranged to be moved to discharging position, and means for controlling the movement of the receiver, comprising a pair of frictionally engaging members, one connected to be driven as the load receiver moves, while the other remains stationary, means responsive to the speed of the receiver for regulating the friction between the members, and means responsive to the movement of the receiver to a definite position for increasing the friction to stop the movement.

47. In a weighing machine, a load receiver arranged to be moved to discharging position, means for preventing the movement of the receiver, means for stopping the charging of the receiver in response to the acquisition of a heavy enough load, and means for rendering the movement preventing means ineffective after an appreciable interval has elapsed from the stopping of the charging.

48. In a weighing machine, a load receiver, means for charging the receiver, a member movable in accordance with the load in the receiver, an electrical translating device for controlling the operation of the charging means, a circuit for energizing said device, and means for varying the current flow in said circuit in response to the movement of the member substantially to a predetermined position, comprising means electrically influenced at a distance by the arrival of the member to this position.

In testimony whereof, I have hereunto set my hand.

WILLIAM H. REES.